Dec. 15, 1942. A. G. REYNOLDS ET AL 2,305,193

JUICE EXTRACTOR

Original Filed Aug. 21, 1937  2 Sheets-Sheet 1

INVENTOR
Albert G. Reynolds
John T. Holland
John A. Naismith
ATTORNEY

Dec. 15, 1942. A. G. REYNOLDS ET AL 2,305,193
JUICE EXTRACTOR
Original Filed Aug. 21, 1937 2 Sheets-Sheet 2

INVENTORS
Albert G. Reynolds
John T. Golland
John A. Naismith
ATTORNEY

Patented Dec. 15, 1942

2,305,193

UNITED STATES PATENT OFFICE 2,305,193

JUICE EXTRACTOR

Albert G. Reynolds, Oakland, Calif., and John T. Yolland, Seattle, Wash., assignors to R. Y. P. Mfg. Co., Oakland, Calif., a partnership composed of Albert G. Reynolds, John T. Yolland, and Gust O. Peterson Application August 21, 1937, Serial No. 160,348
Renewed October 14, 1939

3 Claims. (Cl. 146—76)

The present invention relates particularly to means for extracting juices from fruits, vegetables and meats.

In the extraction of juices from various materials of the character indicated it is common practice to grind the material to a pulp and then subject the pulp to pressure to release the juice therefrom. This method has not given the desired results because the grinding means used does not reduce the material to a sufficiently fine state to release all of the juice therein, nor does the pressing discharge all of the juice from the ground or shredded mass.

It is one object of the invention, therefore, to provide a machine constructed and arranged to completely break down the physical structure of the material passed therethrough whereby the maximum amount of juice is released for extraction.

It is another object of the invention to provide a machine whereby substantially all of the liquid may be quickly and easily extracted from a fluid mass, or separated from solid material held in suspension therein.

It is also an object of the invention to provide a machine of the character indicated that will be economical to manufacture, simple in form and construction, easily operated and cleaned, that is strong, compact, and durable, and highly efficient in its practical application.

Figure 1:
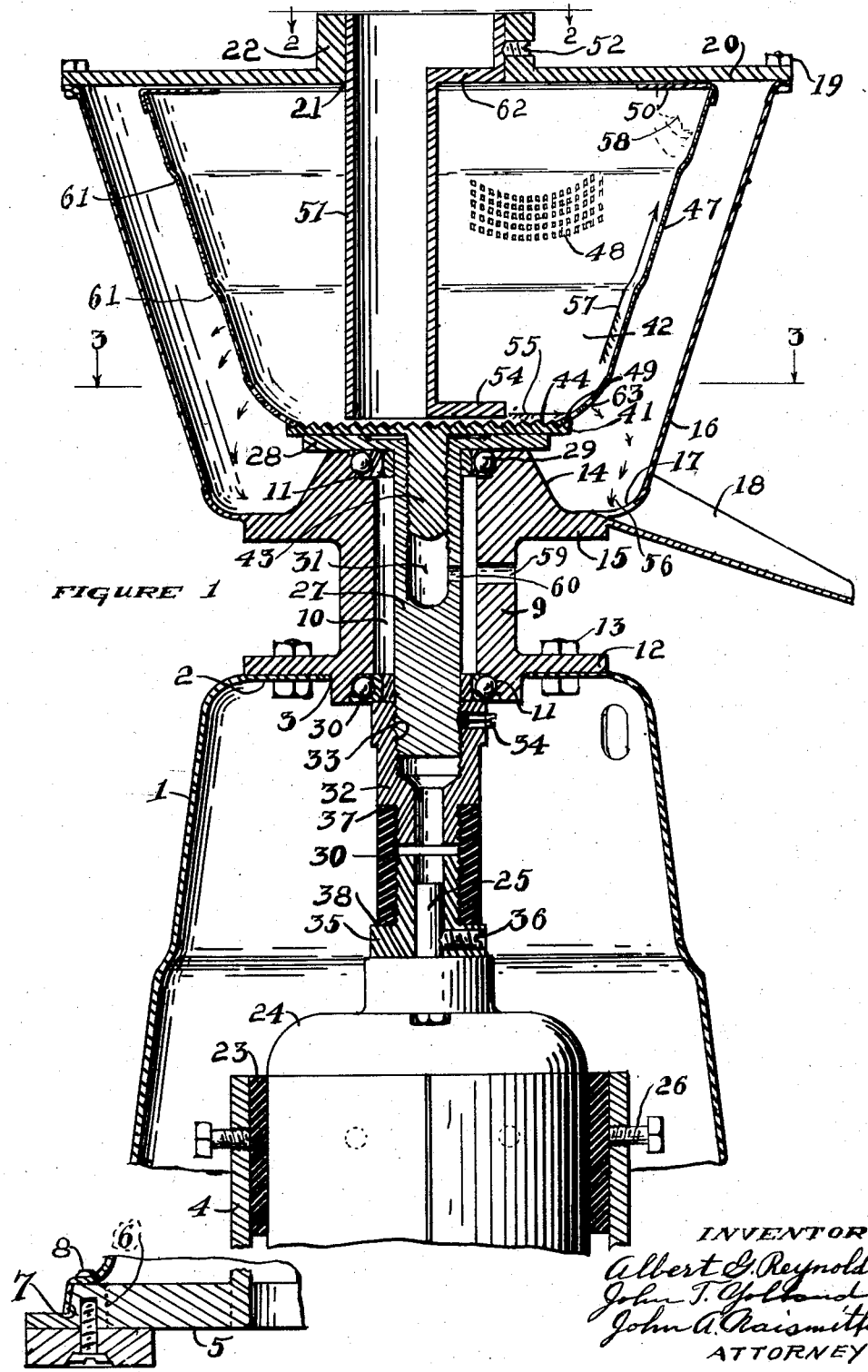
Figure 1 is a vertical section through a machine embodying our invention, with parts broken away.
Figure 2:
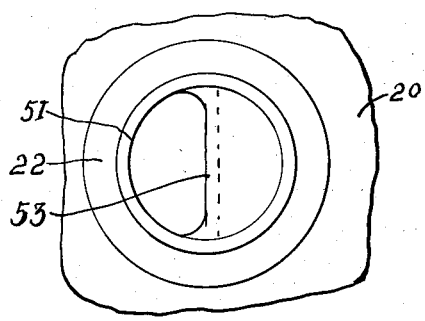
Figure 2 is a plan view on line 2—2 of Figure 1, with parts broken away.

In the particular embodiment of the invention herein disclosed we show at 1 a body portion or housing preferably formed of sheet metal. This housing has a conical conformation and is provided with an inwardly directed flange as 2 on its upper end, the inner edge of the flange being formed to define an axially disposed circular opening as 3.

At 4 is shown a cast metal cylinder having laterally extending arms as 5. Formed integrally with arms 5 is an annulus 6 concentrically disposed relative to the axis of the cylinder and provided with a shoulder 7 upon which the bottom of housing 1 rests, and to which the housing is secured as at 8. The structure described forms a solid and substantial base upon which all of the rest of the machine is mounted.

At 9 is shown a bearing member having a cylindrical passage 10 formed axially therethrough and provided with a raceway 11 at each end. The lower end of member 9 is formed to engage opening 3, and is provided with a laterally extending flange 12 adapted to seat on flange 2, to which it is secured by bolts 13. The upper end of member 9 has a conical formation as at 14 and is provided with an outwardly and horizontally disposed flange 15 at the base of the conical portion. Upon the outer edge of the flange 15 is mounted a sheet metal bowl 16 in which the extracted juice is collected, the collected juice being discharged through a hole 17 in its base and thence over a spout 18.

Upon the top of the bowl 16, and removably secured thereto by bolts as 19, is a cover plate 20 having an axially disposed circular opening 21 formed therein, the opening being further defined by an upstanding annular flange 22.

Seated against the inner wall of the cylinder 4 is a rubber ring 23, and inserted through this ring is the driving motor 24 with its drive shaft 25 in axial alignment with the passage 10. The motor is held rigidly in position by means of set screws passing through the cylinder 4 and bearing against the ring 23 which is thereby brought into intimate contact with the motor, as shown at 26.

A drive spindle is shown at 27 passing axially through passage 10 and having a top flange 28 overlying the top of member 9, the spindle being fitted with an upper ball bearing 29 operating in the upper raceway 11. Slidably mounted on the lower end of the spindle is a lower ball bearing 30 disposed to operate in lower raceway 11. In the upper end of the spindle 27 is formed a socket 31 for the purpose hereinafter set forth.

The driving connection between the motor shaft 25 and the spindle 27 is effected in the following manner. A connector element 32 is threaded on to the lower end of spindle 27 as at 33 and secured in position by set-screw 34. This element not only serves as a connecting element but also bears against the lower bearing 30 and serves to lock the spindle 27 and the bearings in place. A similar connector element 35 is mounted on motor shaft 25 and secured by set-screw 36. The two elements are provided with opposed shoulders as at 37 and 38 engaging a short connecting rubber tube 39. When the motor is in operation the spindle 27 is rotated in the direction indicated by arrow 40, the flexible connection 39 compensating for any slight misalignment of the motor 24.

The grinding plate is shown at 41, this plate forming the bottom of basket 42 and having a threaded pin 43 depending from the center of its under side by means of which it is screwed into the socket 31. The upper side of the plate 41 is provided with a grinding or grating surface 44 provided with a pattern of triangular bosses 45. Each boss is triangular in transverse cross-section and oblong in form, with inclined ends, forming grinding ridges as 46 instead of the customary sharp points. In the present case these ridges are spaced from each other and lie in spaced parallel rows.

The side wall of basket 42 is formed of perforated sheet metal formed as shown by spinning, in which process the rows of perforations are moved into arcuate formation as shown at 48, the screen itself being indicated at 47. In order to secure the desired results the screen must lie at an angle of not less than sixteen degrees or more than twenty degrees from the vertical, and I have found that the best results are obtained when the angle is about eighteen degrees, that being the angle shown. The bottom of the screen 47 is mounted on the edge of plate 41 as at 49, and the top edge is capped by an inwardly extending flange as 50.

For introducing material into the machine we provide a tubular member 51. The upper end of member 51 is circular in form and slidably engages the flange 22, being secured in place by set-screw 52. That portion of the tube below the plate 20 is semi-circular in horizontal cross-section as shown at 53, its extreme lower end terminating in a horizontal flange 54 having, together with the tube, a diameter equal to the upper end. The tube discharges vertically upon the plate 41, and the foot piece 54 just clears the plate.

With the motor rotating the basket at some ten thousand revolutions per minute the material to be operated upon, say carrots or celery, is thrust downwardly through the non-rotating tube 51 and on to the plate 41. Here it engages the bosses 45 torn apart, and passed out under foot-piece 54.

It will be noted that the feeding tube 51 is disposed in eccentric relation to the axis of revolution of the plate 41, the said axis aligning with the flat side of the tube, so that the material must necessarily pass under the foot-piece 54 as the plate carries it around. Due to the formation of the bosses 45 and the position of the foot-piece the material is ground extremely fine, the centrifugal force developed by the rotating plate throwing it outwardly against the screen 47 as indicated by arrow 55. Since the screen is finer than the ground solid material the liquid only is allowed to go through, and this is discharged as indicated by arrows 56. Since the screen basket wall is flared upwardly and outwardly the ground solid material is caused to creep up the same as indicated at 57 until it gathers at 58. We have found that, due to the extremely fine grinding of the material and the speed at which the basket is rotated, and the degree of inclination of the basket wall, the liquid is completely separated from the solid material which is practically dry when it reaches the top of the side wall.

When it is desired to clean the basket 47 it is only necessary to remove the top 20, pass a pin through hole 59 in member 9 and into engagement with hole 60 in spindle 27 to prevent rotation of the same, whereupon the basket may be unscrewed from socket 31 and removed.

In forming the side wall of the basket 47 its diameter is not increased uniformly from the bottom to the top, but sections thereof are offset to form more sharply inclined connecting shoulders as indicated at 61. By suddenly increasing the diameter of the basket in this manner the upwardly creeping film of solid matter is caused to break or loosen at each shoulder or step, the particles rearranging themselves as they ascend the next higher section. By this means, and by the necessary rearrangement of the particles occasioned by the increasing diameter of each section, all of the liquid trapped in the moving mass is released.

The side 47 of the basket is spun from a sheet of perforated sheet metal and consequently is without seams. The perforations 48 in the flat sheet lie in straight parallel rows, but in working the sheet up into the desired form these rows assume an arcuate shape as described, the rows bending upwardly as shown and facilitating the movement of the material over the screen.

Referring again to the tube 51, since the body portion is semi-circular in form and the top portion is circular, a shelf portion is formed at 62. By this construction the tube will receive a mass that is relatively large in diameter, which by pressure can be crowded into the more restricted semi-circular portion. When this material is pressed down upon the grater plate it is progressively ground away and passed under the foot-piece 54 where it is still further disintegrated before it is thrown outwardly against the wall 47.

An important feature of the present invention is the grinding plate 41 and its mode of operation will now be more particularly described.

Figure 3:
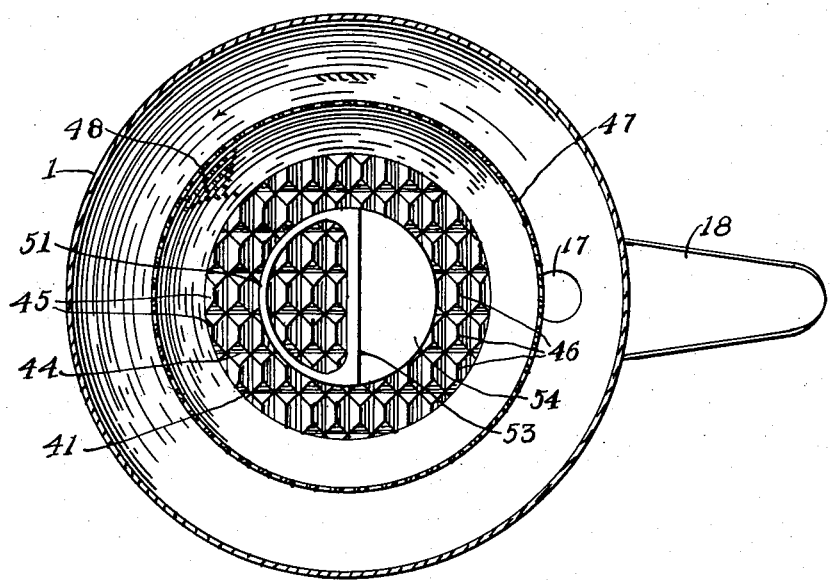
Figure 3 is a horizontal cross-section on line 3—3 of Figure 1.
Figure 4:
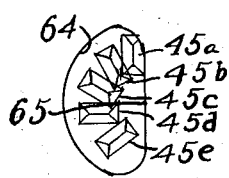
Figure 4 is a diagrammatical illustration showing the mode of operation of the grater plate.

In the diagram shown in Figure 4 the outline 64 represents the inner conformation, in plan, of the tube down which material is fed, and since this tube has one flat side lying in the axis of rotation of plate 41 the said axis will fall at point 65. Selecting the uppermost boss 45 appearing through the tube and paralleling the flat side thereof when the plate 41 is in the position shown in Figure 3, and adjacent said flat side, for the purpose of illustration, its starting position is indicated at 45a in the diagram. As the plate 41 rotates the boss passes through positions 45b, 45c, 45d, 45e. Since the outer end of the ridge 46 travels in a larger circle than the inner end adjacent the axis 65 it follows that a shearing effect is secured that satisfactorily reduces even coarse fibred material where pyramidal or conical bosses would merely tear the material into long shreds. It will now be apparent that by arranging the bosses as described their several paths of travel will overlap and a very complete disintegration of the material is effected, the material being fed on to the plate with its fibres preferably at right angles thereto.

In order to prevent the reduced material from packing in the bottom of the basket the bottom is cupped as at 63, this formation causing the pulp to form a film at the very bottom of the screen. The screen is hereinbefore described as being spun, but of course it may be formed in any suitable manner.

It is to be understood, of course, that while I have herein shown and described but one specific embodiment of the invention, changes in form, construction, and method of assembly and operation may be made within the scope of the appended claims.

We claim:

1. In a machine of the character described, a feeding tube having a semi-circular conformation in transverse cross-section throughout the major portion of its length, but provided with a circular receiving end, and having a foot-piece lying in the plane of its discharge end and extending laterally from its flat side.

2. In combination, a rotatable grater plate provided with a patern of oblong bosses arranged in parallel rows and with contiguous bases, each boss having converging sides and ends to form a short ridge, and a material feeding tube fixedly supported relative to the plate and disposed to discharge thereon on one side of its axis of rotation, said tube having a foot-piece associated therewith and disposed to closely overlie the plate on the opposite side of its axis of rotation.

3. In a machine of the character described, a fixedly supported feeding tube having a semi-circular conformation in transverse cross-section and having a foot-piece lying in the plane of its discharge end and extending laterally from its flat side, and a grater plate underlying the discharge end of the tube and the foot-piece in close and parallel relation thereto and mounted to rotate on an axis aligned with the center of the flat side of the tube, said plate being provided with a pattern of oblong bosses arranged in parallel rows and with contiguous bases, each boss having converging sides and ends to form short ridges.

ALBERT G. REYNOLDS.
JOHN T. YOLLAND.